June 28, 1966  E. M. KLOPP ETAL  3,258,365
CATHODE-DEPOLARIZERS FOR HIGH TEMPERATURE
ELECTROCHEMICAL DEVICES
Filed June 20, 1962
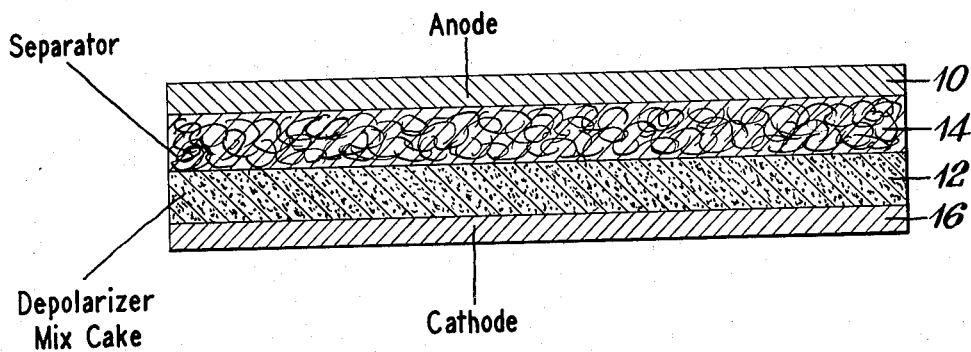
INVENTORS
EDWARD M. KLOPP
SEYMOUR SENDEROFF
ROBERT E. HANSEN
BY *John R ...*
ATTORNEY

# United States Patent Office 3,258,365
Patented June 28, 1966

3,258,365
CATHODE-DEPOLARIZERS FOR HIGH TEMPERATURE ELECTROCHEMICAL DEVICES
Edward M. Klopp, Medina, Seymour Senderoff, Fairview Park, and Robert E. Hansen, Cleveland, Ohio, assignors to Union Carbide Corporation, a corporation of New York
Filed June 20, 1962, Ser. No. 203,851
9 Claims. (Cl. 136—90)

This invention relates to high temperature electrochemical devices and refers more particularly to certain improved cathode-depolarizers therefor.

More specifically, this invention relates to high temperature electrochemical devices of the thermal cell type having an anode and an electrolyte of a fused salt, and to the provision therein of certain improved cathode-depolarizers which are thermally stable at elevated temperatures.

Although the invention is primarily useful in high temperature thermal cells and will be described particularly in this connection, it is to be understood that the invention is applicable to other types of high temperature electrochemical devices employed for both chemical synthesis and electrical power.

Thermal cells have been known for sometime now. They are based on an electrolyte of a fused salt which is solid and stable at low temperatures. When heated to elevated temperatures beyond the melting point of the electrolyte, these thermal cells become activated and electrical energy can be withdrawn from them. An outstanding advantage of thermal cells is their ability to be stored at relatively low temperatures for an indefinite period of time without any loss of their potential energy.

Hitherto basically two materials have been employed as the cathode-depolarizer in thermal cells. These are $CrO_3$ and $V_2O_5$. Both of these materials have, however, suffered from certain disadvantages. For instance, $CrO_3$ begins to decompose at a relatively low temperature below about 200° C. This has proven to be a rather serious drawback since most thermal cells employ as the electrolyte a eutectic of KCl-LiCl which melts at a temperature of about 350° C. Hence $CrO_3$ is appreciably decomposed when the thermal cells are activated. $V_2O_5$, on the other hand, is somewhat more thermally stable but has nonetheless suffered in that its coulombic capacity is extremely low, resulting in thermal cells having low energy densities. Furthermore, $V_2O_5$ is prone to reaction with the KCl-LiCl electrolyte. This reaction produces chlorine and reduced vanadium compounds which are non-reactive and, in consequence, only a small fraction of the potential energy can be withdrawn from the thermal cells, the major portion being dissipated as heat.

Broadly stated, the principal object of the invention is to provide certain improved cathode-depolarizers for high temperature electrochemical devices.

A more specific object is to provide certain improved cathode-depolarizers for high temperature thermal cells having high coulombic capacities and which are not prone to reaction with the electrolyte, and which are thermally stable at elevated temperatures.

Another object is to provide high temperature thermal cells which are capable of delivering high outputs of energy per unit weight of active material.

Still another object is to provide high temperature thermal cells which are capable of delivering high energy outputs for longer periods of discharge.

These and other objects are achieved by the invention which will be described with reference to the accompanying drawing, wherein the single figure is a vertical section of a typical thermal cell embodying the invention.

According to the invention, there are provided as the cathode-depolarizers in high temperature electrochemical devices particularly of the thermal cell type, certain metal oxides chosen from the group consisting of cupric oxide and antimony trioxide. These metal oxides possess high coulombic capacities, they are not prone to reaction with the electrolyte and they are thermally stable at elevated temperatures upwards of at least 600° C.

Referring now to the drawing, the thermal cell shown comprises an anode 10 suitably composed of calcium or magnesium metal, and a cathode-depolarizer mix cake 12 containing electrolyte, for example, a eutectic of KCl-LiCl. Between the anode 10 and the cathode-depolarizer mix cake 12 is a separator 14 of a bibulous material which is impregnated with the electrolyte, the separator 14 being suitably composed of a porous layer of powdered fused magnesia, zirconia or alumina. A cathode-collector 16 of nickel, for example, is disposed adjacent to the mix cake 12.

Although not shown, the thermal cell may be provided with a container of most any design. The container should be hermetically sealed and should be composed of materials which are stable at high temperatures. A suitable container is described and claimed in the copending application of T. J. Kurtzweil et al., Serial No. 203,813, filed on January 20, 1962, now Patent No. 3,201,278.

In the practice of the invention, the cathode-depolarizer is employed in a finely-divided state and is incorporated into the mix cake 12, suitably by molding, preferably with a conductive material in an amount sufficient to keep the resistance of the cell as low as possible. The conductive material may be powdered carbon or graphite, for example, or it may be a finely-divided metal, copper being suitable. It should be mentioned that the electrolyte is preferably added before the mix cake 12 is made, so that an intimate mixture of electrolyte and depolarizer is achieved. This can be important should it be desired to keep the concentration polarization of the cell at a minimum level.

The electrolyte should be a fused salt which does not react with the cell ingredients and which possesses a high ionic conductivity. Besides the KCl-LiCl electrolyte, a fused salt of the eutectic of $K_2SO_4$-$Li_2SO_4$ or KCl-NaCl can be used, the latter being particularly suitable at temperatures above 650° C.

Where convenient, the proportions of active ingredients should be kept as close as possible to the stoichiometric requirements for a balanced cell reaction. When a conductive material is used in the mix cake 12, the amount will, of course, depend on the conductivity of both the cathode-depolarizer and electrolyte.

The relation between voltage and current for both cupric oxide and antimony trioxide against a chlorine reference electrode at 600° C. was investigated in order to determine the mechanism involved in the electrolytic reduction of the cathode-depolarizer. The results of this investigation showed that when cupric oxide is used, the ultimate product of the reaction is a mixture of elemental copper and cuprous oxide, while in the case of antimony trioxide, the product is elemental antimony.

The reactions involved for the system Ca/KCl-LiCl/CuO may thus be represented by the following equations:

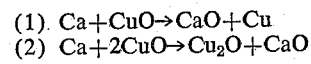

A further disproportionation of $Cu_2O$ to Cu and CuO may also occur under certain circumstances according to the equation:

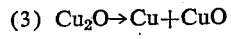

In this case, the CuO thus produced is available for reduction by Equations (1) or (2) with the generation of energy.

When antimony trioxide is used as the cathode-depolarizer, the reaction takes place by the following equation:

(4) $3Ca + Sb_2O_3 \rightarrow 3CaO + 2Sb$

The outstanding advantage of the cathode-depolarizers of the invention reside in their thermal stability at elevated temperatures. The equilibrium pressure of oxygen above CuO for the decomposition reaction $2CuO \rightarrow Cu_2O + \frac{1}{2}O_2$ is only $10^{-4}$ atmospheres at 700° C. and even at 900° C., it is only $3 \times 10^{-2}$ atmospheres. $Sb_2O_3$ is even more thermally stable since the equilibrium pressure of oxygen over $Sb_2O_4$ for the decomposition $\frac{1}{3}Sb_2O_3 \rightarrow \frac{2}{3}Sb + \frac{1}{2}O_2$ at 1273° C. is only about $10^{-16}$ atmospheres. In addition to their thermal stability, the cathode-depolarizers are at most only slightly soluble in the KCl-LiCl eutectic and are not prone to reaction with the electrolyte.

A further advantage of thermal cells of the invention is that of high energy densities, that is, energy output per weight of active material. Furthermore, the thermal cells are capable of delivering this high energy output for longer periods of discharge. In comparison to prior thermal cells in which discharge periods of up to only several minutes could be obtained, the thermal cells of the invention can be discharged for periods of up to 30 minutes or more at current densities of about 100 to 500 ma/cm.²

The following examples are illustrative of the practice of the invention.

*Example I*

A thermal cell employing an anode of calcium metal and cathode-depolarizer mix cake containing 65.8% by weight of CuO, 6.6% by weight of copper and 27.6% by weight of a eutectic of KCl-LiCl as the electrolyte was made and then discharged through a 2 ohm resistor at a temperature of about 600° C. The open circuit voltage of the cell was 2.43 volts and the energy density based on the reaction (1) above was approximately 282 watt-hrs./lb.

*Example II*

A thermal cell employing an anode of calcium metal and a cathode-depolarizer mix cake containing 58.8% by weight of $Sb_2O_3$ and 41.2% by weight of a eutectic of KCl-LiCl as the electrolyte was made and then discharged through a 2 ohm resistor at a temperature of about 600° C. The open circuit voltage of the cell was 2.45 volts and the energy density was approximately 132 watt-hrs./lb.

The values of energy density given in the above examples were calculated on the basis of a balanced composition, that is, for the combined weight of the anode and calculated amount of cathode-depolarizer required for a balanced cell. The cathode-depolarizer employed in the examples was in excess of that required by a small amount so that the actual values of energy density would be slightly lower than indicated.

We claim:

1. A thermal cell comprising an anode, a fused salt electrolyte, a cathode-depolarizer and a cathode-collector adjacent to said cathode-depolarizer, said cathode-depolarizer being selected from the group consisting of cupric oxide and antimony trioxide.

2. A thermal cell as defined by claim 1 wherein said anode is composed of a metal selected from the group consisting of calcium and magnesium.

3. A thermal cell as defined by claim 1 wherein said cathode-collector is composed of nickel.

4. A thermal cell as defined by claim 1 wherein said fused salt electrolyte is composed of a eutectic selected from the group consisting of KCl-LiCl, KCl-NaCl and $K_2SO_4$-$Li_2SO_4$.

5. A thermal cell comprising an anode, a cathode-depolarizer mix cake, a bibulous separator impregnated with a fused salt electrolyte between said anode and cathode-depolarizer mix cake, and a cathode-collector, said cathode-depolarizer mix cake containing a compound selected from the group consisting of cupric oxide and antimony trioxide.

6. A thermal cell as defined by claim 5 wherein said depolarizer mix cake contains a conductive material selected from the group consisting of carbon, graphite and copper.

7. A thermal cell as defined by claim 5 wherein said compound is cupric oxide.

8. A thermal cell as defined by claim 5 wherein said compound is antimony trioxide.

9. A thermal cell as defined by claim 5 wherein said separator is composed of a material selected from the group consisting of magnesia, zirconia and alumina.

References Cited by the Examiner

UNITED STATES PATENTS

| | | | |
|---|---|---|---|
| 1,303,453 | 5/1919 | Benner et al. | 136—137 |
| 1,920,151 | 7/1933 | Ruben | 136—100 |
| 2,562,215 | 7/1951 | Ruben | 136—143 |
| 2,999,122 | 9/1961 | Zauner | 136—153 |
| 3,079,454 | 2/1963 | McGinnis | 136—137 |

FOREIGN PATENTS 1,273  1/1884  Great Britain.

ALLEN B. CURTIS, *Primary Examiner.*

JOHN H. MACK, WINSTON A. DOUGLAS, *Examiners.*

D. L. WALTON, *Assistant Examiner.*